(12) United States Patent
Kashiwagi

(10) Patent No.: US 10,474,022 B2
(45) Date of Patent: Nov. 12, 2019

(54) ILLUMINATOR AND PROJECTOR

(71) Applicant: SEIKO EPSON CORPORATION, Tokyo (JP)

(72) Inventor: Akihiro Kashiwagi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/043,704

(22) Filed: Jul. 24, 2018

(65) Prior Publication Data

US 2019/0041738 A1 Feb. 7, 2019

(30) Foreign Application Priority Data

Aug. 2, 2017 (JP) ................. 2017-149708

(51) Int. Cl.
*G03B 21/20* (2006.01)
*G03B 21/28* (2006.01)
(Continued)

(52) U.S. Cl.
CPC ..... *G03B 21/2073* (2013.01); *G02B 27/1053* (2013.01); *G03B 21/204* (2013.01); *G03B 21/208* (2013.01); *G03B 21/28* (2013.01); *G03B 33/12* (2013.01); *G02B 3/0062* (2013.01); *G02B 5/0278* (2013.01); *G02B 27/0961* (2013.01);
(Continued)

(58) Field of Classification Search
CPC ........ G03B 21/20; G03B 21/28; G03B 33/12; G03B 21/2073; G03B 21/204; G02B 5/02; G02B 27/14; G02B 27/10; G02B 27/1053; G02B 3/0062; G02B 27/286; G02B 27/283; G02B 27/0961; G02B 27/149; G02B 5/0278
See application file for complete search history.

(56) References Cited

U.S. PATENT DOCUMENTS 7,507,942 B2 3/2009 Tatsuno
8,733,940 B2 5/2014 Tanaka et al.
(Continued)

FOREIGN PATENT DOCUMENTS

JP 2007-333856 A 12/2007
JP 2012-047996 A 3/2012
(Continued)

*Primary Examiner* — Sultan Chowdhury
*Assistant Examiner* — Danell L Owens
(74) *Attorney, Agent, or Firm* — Oliff PLC

(57) ABSTRACT

An illuminator includes a light source apparatus that outputs first light containing a first polarized light component, an afocal system that includes a first lens and a second lens so arranged that optical axis directions thereof coincide with each other and reduces the light flux diameter of the first light, a polarization adjusting element that converts the first light, while transmitting the first light, into second light containing the first polarized light component and a second polarized light component the polarization direction of which is perpendicular to the polarization direction of the first polarized light component, and a polarization separation element that separates the second light into light formed of the first polarized light component and light formed of the second polarized light component. The polarization adjusting element is located between the first lens and the second lens.

14 Claims, 6 Drawing Sheets

(51) Int. Cl.
    *G03B 33/12*     (2006.01)
    *G02B 27/10*     (2006.01)
    *G02B 5/02*     (2006.01)
    *G02B 27/14*     (2006.01)
    *G02B 3/00*     (2006.01)
    *G02B 27/09*     (2006.01)
    *G02B 27/28*     (2006.01)

(52) U.S. Cl.
    CPC .......... *G02B 27/149* (2013.01); *G02B 27/283* (2013.01); *G02B 27/286* (2013.01)

(56) References Cited

U.S. PATENT DOCUMENTS

| | | |
|---|---|---|
| 9,599,316 B2 | 3/2017 | Yamada et al. |
| 9,860,497 B2 | 1/2018 | Kashiwagi |
| 2002/0131020 A1* | 9/2002 | Huang ................. G02B 27/283 353/20 |
| 2007/0297170 A1 | 12/2007 | Tatsuno |
| 2012/0133903 A1* | 5/2012 | Tanaka ............... G03B 21/2013 353/31 |
| 2012/0140183 A1 | 6/2012 | Tanaka et al. |
| 2013/0229604 A1* | 9/2013 | Aboshi ................ G02B 5/3083 349/117 |
| 2015/0167932 A1 | 6/2015 | Yamada et al. |
| 2016/0033853 A1 | 2/2016 | Akiyama |
| 2016/0241824 A1 | 8/2016 | Kashiwagi |
| 2017/0123300 A1* | 5/2017 | Shishido ............... G02B 3/0062 |

FOREIGN PATENT DOCUMENTS

| | | |
|---|---|---|
| JP | 2012-137744 A | 7/2012 |
| JP | 2013-250494 A | 12/2013 |
| JP | 2016-151655 A | 8/2016 |
| JP | 2016-170422 A | 9/2016 |

* cited by examiner

ILLUMINATOR AND PROJECTOR

BACKGROUND

1. Technical Field

The present invention relates to an illuminator and a projector.

2. Related Art

JP-A-2012-137744 discloses a light source apparatus including a solid-state light source unit including semiconductor lasers, a dichroic mirror, a fluorescence emitting plate, and a polarization direction converter. In the light source apparatus, the linearly polarized light outputted from the solid-state light source unit passes through a pair of lenses that reduce the light flux diameter and a retardation film that converts the polarization direction of the linearly polarized light incident thereon, and the resultant light is incident, on the dichroic mirror. The light incident on the dichroic mirror is separated in terms of polarization into an S-polarized light component and a P-polarized light component. The S-polarized light component excites the fluorescence emitting plate to cause it to emit fluorescence, and the P-polarized light component is converted by the S-polarization direction converter into polarized light and reflected off the dichroic mirror. The color light from the fluorescence emitting plate and the color light from the polarization direction converter are thus combined with each other by the dichroic mirror, and the combined light exits out of the dichroic mirror.

The pair of lenses, which reduce the light flux diameter of the light to be incident on the dichroic mirror, is called an afocal system. The pair of lenses of the afocal system need to be so disposed as to be sufficiently separate from each other to sufficiently reduce the diameter of the light flux. The gap between the pair of lenses of the afocal system forms a dead space where no other part is allowed to be disposed, partially causing an increase in the size of the illuminator.

SUMMARY

An advantage of some aspects of the invention is to provide an illuminator the size of which can be reduced.

An illuminator according to an aspect of the invention includes a light source apparatus that outputs first light containing a first polarized light component, an afocal system that includes a first lens and a second lens so arranged that optical axis directions thereof coincide with each other and reduces a light flux diameter of the first light, a polarization adjusting element that converts the first light, while transmitting the first light, into second light containing the first polarized light component and a second polarized light component a polarization direction of which is perpendicular to a polarization direction of the first polarized light component, a polarization separation element that separates the second light into light formed of the first polarized light component and light formed of the second polarized light component, a diffuser element on which one of the light beams separated by the polarization separation element is incident, and a fluorescence emitting element on which the other one of the light beams separated by the polarization separation element is incident, and the polarization adjusting element is located between the first lens and the second lens.

According to the configuration described above, the polarization adjusting element is disposed between the first lens and the second lens of the afocal system. The size of the illuminator can therefore be reduced by the space required to dispose the polarization adjusting element, as compared with a structure of related art in which the polarization adjusting element is disposed on the downstream side of the afocal system.

The afocal system, on which parallelized light is incident, outputs parallelized light having a reduced light flux diameter. Non-parallelized light is therefore incident on the polarization adjusting element, which is located between the first lens and the second lens. More specifically, the angle of incidence of the first light incident on the polarization adjusting element increases with distance from the center axis of the first light. The polarization state of the light passing through the polarization adjusting element changes in accordance with the distance over which the light travels through the polarization adjusting element. That is, when non-polarized light is incident on the polarization adjusting element, the polarization state of the non-polarized light changes in accordance with the angle of incidence. More specifically, when the angle of incidence of the light formed of the first polarized light component and incident on the polarization adjusting element increases, the proportion of the second polarized light component in the second light increases. Therefore, according to the configuration described above, the second light is so formed that the proportion of the second polarized light component increases with distance from the center axis toward the outer side of the polarization adjusting element. The light incident on the diffuser element or the fluorescence emitting element is therefore allowed to have intensity that increases with distance from the center axis. As a result, a satisfactory diffusion characteristic can be provided.

The illuminator according to the aspect of the invention may be configured such that the light outputted by the light source apparatus is blue light, and light converted by the fluorescence emitting element in terms of wavelength and emitted by the fluorescence emitting element is yellow light.

According to the configuration described above, the light outputted from the diffuser element can be blue light, and the light emitted from the fluorescence emitting element can be yellow light. The light outputted from the diffuser element (blue light) and the light emitted from the fluorescence emitting element (yellow light) can be combined with each other to form white light.

The illuminator according to the aspect of the invention may be configured to further include a polarization adjusting mechanism that adjusts proportions of the first and second polarized light components in the second light by rotating the polarization adjusting element in a plane that intersects a center axis of the first light.

According to the configuration described above, the proportions of the light beams separated by the polarization separation element and incident on the diffuser element and the fluorescence emitting element can be adjusted. The proportions of the light beams outputted from the diffuser element and the fluorescence emitting element can therefore be so adjusted that a decrease in brightness due to degradation of each portion over time is suppressed. Further, in the case where the light outputted from the light source apparatus is blue light and the light converted by the fluorescence emitting element in terms of wavelength and emitted by the fluorescence emitting element is yellow light, the polarization adjusting mechanism can adjust the proportions of the light beams to be incident on the diffuse element and the fluorescence emitting element to adjust the color temperature of the white light formed by combining the blue light and the yellow light.

The illuminator according to the aspect of the invention may be configured such that the illuminator further includes a light collection system disposed in an optical path between the polarization separation element and the diffuser element, and the light separated by the polarization separation element and formed of the second polarized light component is collected by the light collection system and incident on the diffuser element.

According to the configuration described above, the light formed of the second polarized light component and collected by the light collection system is incident on the diffuser element. The angle of incidence of the light formed of the second polarized light component and incident on the diffuser element increases with distance from the optical axis. Further, the effect of the polarization adjusting element causes the intensity of the light formed of the second polarized light component to increase with distance from the optical axis. Moreover, the present inventor's intensive study on a case where light is incident on a diffuser element shows that increasing the angle of incidence of the light allows diffusion close to ideal Lambertian diffusion to be achieved even in a case where the diffuser element has a weak diffusion characteristic. In general, a diffuser element having a stronger diffusion characteristic can produce diffusion closer to ideal Lambertian diffusion but produces a large amount of backscatter and has other disadvantages. According to the configuration described above, increasing the proportion of the light having a large angle of incidence in the light incident on the diffuser element allows the diffusion produced by the diffusion element to approach Lambertian diffusion with no strong diffusion characteristic of the diffuser element.

The illuminator according to the aspect of the invention may be configured such that the polarization separation element reflects the light formed of the first polarized light component and transmits the light formed of the second polarized light component, the light formed of the second polarized light component and having passed through the polarization separation element is incident on the diffuser element, and the light formed of the first polarized light component and reflected off the polarization separation element is incident on the fluorescence emitting element.

According to the configuration described above, the illuminator can employ the structure in which the light reflected off the polarization separation element excites the fluorescence emitting element and the light having passed through the polarization separation element is incident on the diffuser element. Further, according to the configuration described above, the light formed of the second polarized light component can be incident on the diffuser element. Since the effect of the polarization adjusting element causes the intensity of the light formed of the second polarized light component to increase with distance from the optical axis, causing the thus configured light to be incident on the diffuser element allows the diffusion produced by the diffuser element to approach Lambertian diffusion.

The illuminator according to the aspect of the invention may be configured such that the polarization separation element transmits the light formed of the first polarized light component and reflects the light formed of the second polarized light component, the light formed of the second polarized light component and reflected off the polarization separation element is incident on the diffuser element, and the light formed of the first polarized light component and having passed through the polarization separation element is incident on the fluorescence emitting element.

According to the configuration described above, the illuminator can employ the structure in which the light having passed through the polarization separation element excites the fluorescence emitting element and the light reflected off the polarization separation element is incident on the diffuser element. Further, according to the configuration described above, the light formed of the second polarized light component can be incident on the diffuser element. Since the effect of the polarization adjusting element causes the intensity of the light formed of the second polarized light component to increase with distance from the optical axis, causing the thus configured light to be incident on the diffuser element allows the diffusion produced by the diffuser element to approach Lambertian diffusion.

The illuminator according to the aspect of the invention may be configured such that the polarization adjusting element is a half wave plate.

According to the configuration described above, using a half wave plate allows adjustment of the proportion of the second polarized light component of the second light to a value ranging from 0% to 100%. Therefore, in a case where the first and second polarized light components are separated from each other based on reflection and transmission using the polarization separation element, the proportion of the light-passing through the polarization separation element and the proportion of the light reflected off the polarization separation element can be freely set. In general, white combined light is produced by causing 10% to 30% of the light to be separated by the polarization separation element to be incident on the diffuser element and causing 70% to 90% of the light to be separated by the polarization separation element to be incident on the fluorescence emitting element. Since the configuration described above allows the proportion of the first polarized light component to be adjusted to any value, the diffuser element and the fluorescence emitting element can be freely arranged relative to the polarization separation element.

The illuminator according to the aspect of the invention may be configured such that the polarization adjusting element is a quarter wave plate.

According to the configuration described above, using a quarter wave plate allows adjustment of the proportion of the second polarized light component of the first light to a value ranging from 0% to 50%. Even when the quarter wave plate is caused to make a full turn in a plane that intersects the center axis of the first light, the proportion of the second polarized light component changes only over the range from 0% to 50%. A quarter wave plate therefore has, as compared with a half wave plate, low sensitivity of the change in the proportion of a polarized light component in response to the angle of rotation. Using a quarter wave plate as the polarization adjusting element allows fine adjustment of the proportion of the second polarized light component.

A projector according to another aspect of the invention includes the illuminator according to the aspect of the invention, a light modulator that modulates light outputted from the illuminator in accordance with image information to form image light, and a projection system that projects the image light.

The size of the projector according to the aspect of the invention can be reduced because the projector includes the illuminator according to the aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
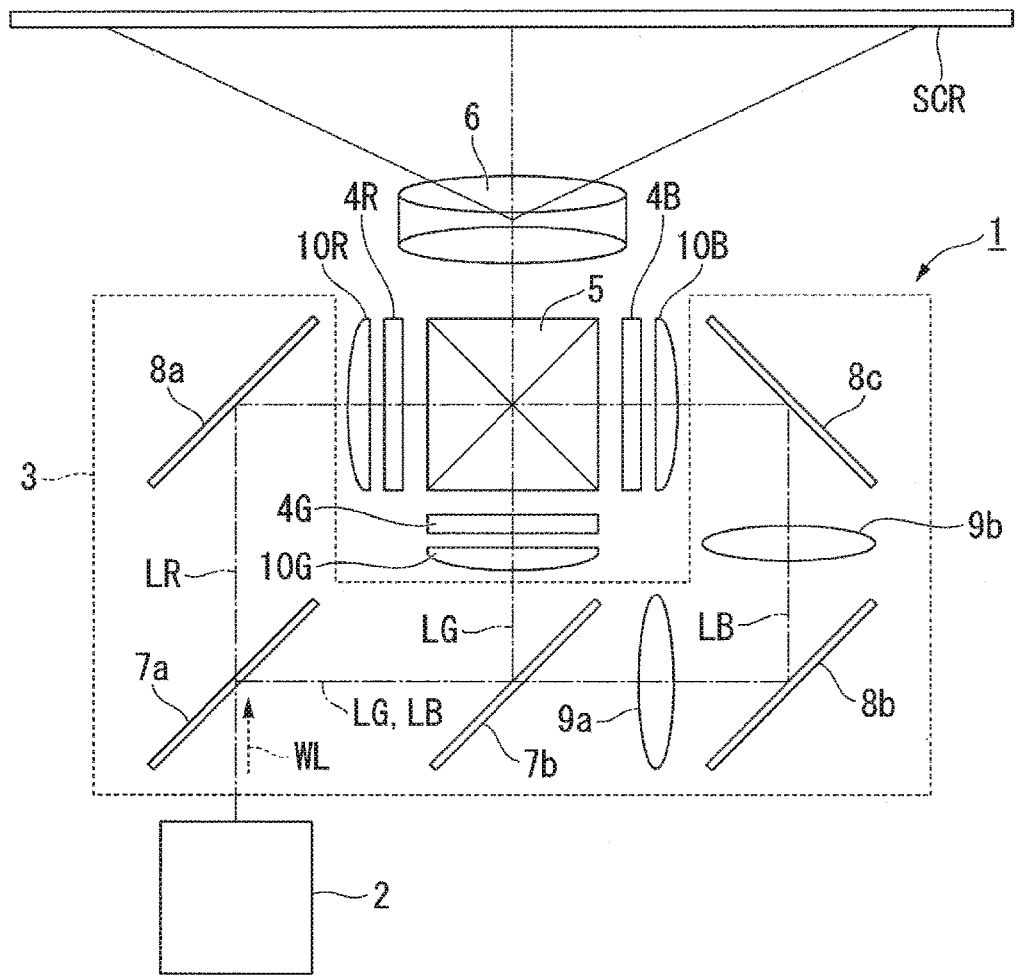
FIG. 1 is a plan view showing a schematic configuration of a projector according to a first embodiment.

A first embodiment of the invention will be described below with reference to FIGS. 1 to 4.

A projector according to the present embodiment is an example of a liquid crystal projector including an illuminator using semiconductor lasers.

In the drawings used in the following description, part of a characteristic portion is enlarged in some cases for clarity of the characteristic thereof, and the dimension ratio and other factors of each component are therefore not always equal to actual values.

Projector

An example of a projector 1 shown in FIG. 1 will first be described.

FIG. 1 is a plan view showing a schematic configuration of the projector 1.

The projector 1 according to the present embodiment is a projection-type image display apparatus that displays a color video (images) on a screen (projection surface) SCR. The projector 1 uses three light modulators corresponding to red light LR, green light LG, and blue light LB. The projector 1 uses semiconductor lasers (laser light sources), which each provide high-luminance, high-power light, as a light source of an illuminator.

Specifically, the projector 1 generally includes an illuminator 2, a color separation system 3, a light modulator 4R, a light modulator 4G, a light modulator 4B, a light combining system 5, and a projection system 6.

The color separation system 3 separates white illumination light WL into the red light LR, the green light LG, and the blue light LB. The color separation system 3 generally includes a first dichroic mirror 7a and a second dichroic mirror 7b, a first total reflection mirror 8a, a second total reflection mirror 8b, and a third total reflection mirror 8c, and a first, relay lens 9a and a second relay lens 9b.

The first dichroic mirror 7a has the function of separating the illumination light WL from the illuminator 2 into the red light LR and the other light (green light LG and blue light LB). The first dichroic mirror 7a transmits the separated red light LR and reflects the other light (green light LG and blue light LB). On the other hand, the second dichroic mirror 7b has the function of separating the other light into the green light LG and the blue light LB. The second dichroic mirror 7b reflects the separated green light LG and transmits the blue light LB.

The first total reflection mirror 8a is disposed in the optical path of the red light LR and reflects the red light LR having passed through the first dichroic mirror 7a toward the light modulator 4R. On the other hand, the second total reflection mirror 8b and the third total reflection mirror 8c are disposed in the optical path of the blue light LB and reflect the blue light LB having passed through the second dichroic mirror 7b toward the light modulator 4B. No total reflection mirror needs to be disposed in the optical path of the green light LG, and the green light LG is reflected off the second dichroic mirror 7b toward the light modulator 4G.

The first relay lens 9a and the second relay lens 9b are disposed in the optical path of the blue light LB and on the light exiting side of the second dichroic mirror 7b, The first relay lens 9a and the second relay lens 9b have the function of compensating optical loss of the blue light LB resulting from the fact that the optical path of the blue light LB is longer than the optical paths of the red light LR and the green light LG.

The light modulator 4R, through which the red light LR passes, modulates the red light LR in accordance with image information to form red image light. The light modulator 4G, through which the green light LG passes, modulates the green light LG in accordance with image information to form green image light. The light modulator 4B, through which the blue light LB passes, modulates the blue light LB in accordance with image information to form blue image light.

A transmissive liquid, crystal panel is, for example, used as each of the light modulators 4R, 4G, and 4B. Polarizers (not shown) are disposed on the light incident side and the light exiting side of each of the liquid crystal panels.

Field lenses 10R, 10G, and 10B are disposed on the light incident side of the light modulators 4R, 4G, and 4B, respectively. The field lenses 10R, 10G, and 10B parallelize the red light LR, the green light LG, and the blue light LB to be incident on the light modulators 4R, 4G, and 4B, respectively.

The image light fluxes from the light modulators 4R, 4G, and 4B are incident on the light combining system 5. The light combining system 5 combines the image light fluxes incident thereon with one another and causes the combined, image light to exit toward the projection system 6. A cross dichroic prism is, for example, used as the light combining system 5.

The projection system 6 is formed of a projection lens group. The projection system 6 enlarges the combined image light from the light combining system 5 and projects the enlarged image light toward the screen SCR. An enlarged color video (images) is thus displayed on the screen SCR.

Illuminator

A specific embodiment of the illuminator 2 will next be described.

Figure 2:
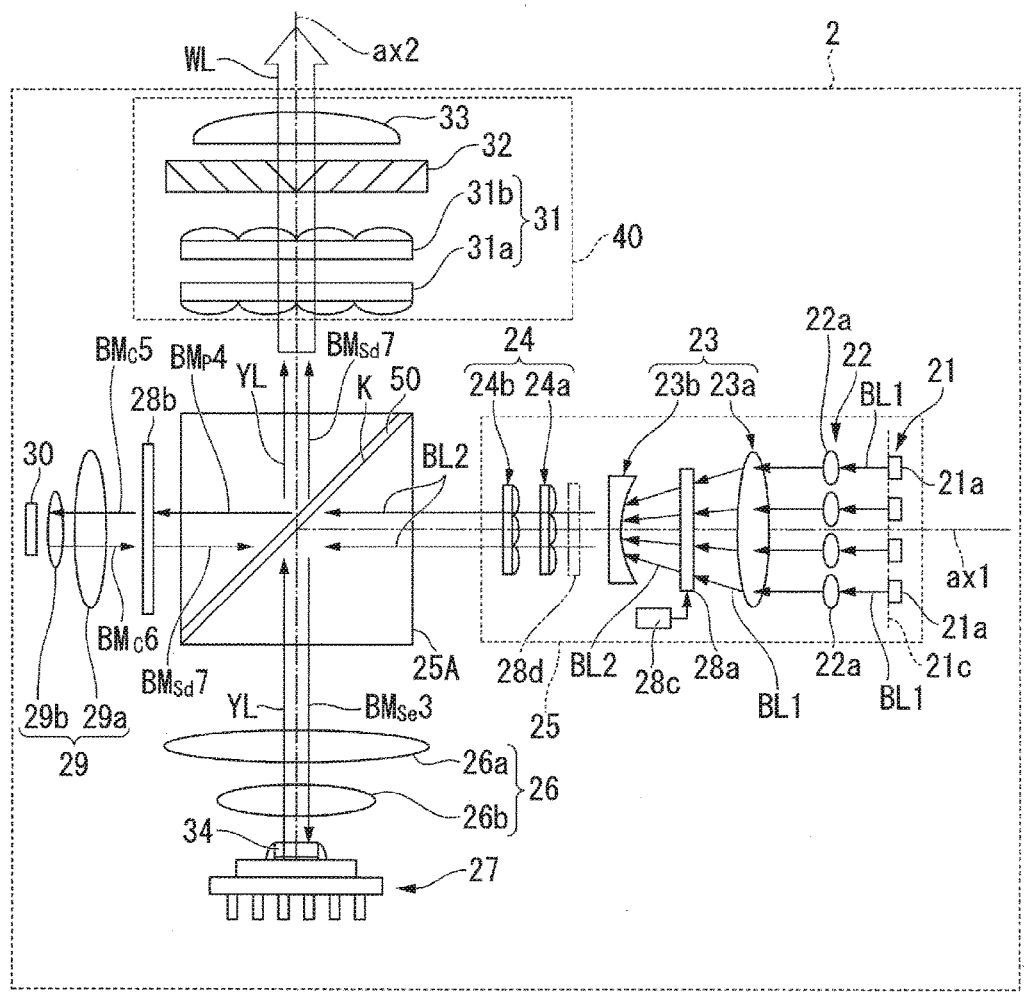
FIG. 2 is a schematic configuration diagram showing an illuminator according to the first embodiment.

FIG. 2 is a schematic configuration diagram showing an illuminator according to the first embodiment.

The illuminator 2 includes an array light source (light source apparatus) 21, a collimator system 22, an afocal system 23, a first retardation film (polarization adjusting element) 28a, a polarization adjusting mechanism 28c, a homogenizer system 24, an optical element 25A including a polarization separation element 50, a first pickup system 26, a fluorescence emitting element 27, a second retardation film 28b, a second pickup system (light collection system) 29, a diffusive reflection element (diffuser element) 30, and a uniform illumination system 40.

The array light source 21, the collimator system 22, the afocal system 23, the first retardation film 28a, the homogenizer system 24, the optical element 25A, the second retardation film 28b, the second pickup system 29, and the diffusive reflection element 30 are sequentially arranged along an optical axis ax1. The fluorescence emitting element 27, the first pickup system 26, and the optical element 25A are sequentially arranged along an optical axis ax2. The optical axis ax1 and the optical axis ax2 are present in the same plane and perpendicular to each other.

The array light source 21 includes a plurality of semiconductor lasers 21a. The plurality of semiconductor lasers 21a are arranged in an array in a single plane 21c perpendicular to the optical axis ax1. The semiconductor lasers 21a each emit a first light beam (first light) BL1, which is formed of linearly polarized blue light. The first light beam BL1 contains a first polarized light component. The first light beam BL1 may contain a second polarized light component having a polarization direction perpendicular to the polarization direction of the first polarized light component in addition to the first polarized light component.

As will be described later, part of the first light beam BL1 is separated from the first light beam BL1 by the polarization separation element 50 and forms light that excites a phosphor layer 34. The other part of the first light beam BL1 is separated from the first light beam BL1 by the polarization separation element 50, travels via the diffusive reflection element 30, and forms blue light for image display.

The first light beams BL1 outputted from the array light source 21 enter the collimator system 22. The collimator system 22 converts the first light beams BL1 outputted from the array light source 21 into a parallelized light flux. The collimator system 22 is formed, for example, of a plurality of collimator lenses 22a arranged in an array. The number of provided collimator lenses 22a is so set as to be equal to the number of semiconductor lasers 21a. The plurality of collimator lenses 22a are disposed in correspondence with the plurality of semiconductor lasers 21a.

The first light beams BL1 having passed through the collimator system 22, which converts the first light beams BL1 into a parallelized light flux, enter the afocal system 23. The afocal system 23 reduces the diameter of the light flux formed of the first light beams BL1.

The afocal system 23 includes a first lens 23a and a second lens 23b, which are so disposed that the optical axis directions thereof coincide with each other. The first lens 23a is located in a position shifted from the second lens 23b toward the collimator system 22 (that is, light incident side). The first lens 23a is a convex lens. The first lens 23a collects the parallelized light having exited out of the collimator system 22 and causes the collected light to exit toward the second lens 23b. The second lens 23b is a concave lens having a concave surface facing the first lens 23a and a flat surface facing away from the concave surface. The second lens 23b parallelizes the light having exited out of the first lens 23a.

The configuration of the first lens 23a and the second lens 23b is not limited to the configuration in the present embodiment. For example, the first lens 23a and the second lens 23b may each be a convex lens. In this case, the light rays intersect with one another in a position between the first lens 23a and the second lens 23b.

The first retardation film 28a is located between the first lens 23a and the second lens 23b of the a focal system 23. The first retardation film 28a transmits the first light beams BL1 collected by the first lens 23a.

According to the present embodiment, the first retardation film 28a is disposed between the first lens 23a and the second lens 23b of the afocal system 23. The size of the illuminator 2 can therefore be reduced by the space required to dispose the first retardation film 28a, as compared with a structure of related art in which the first retardation film 28a is disposed on the downstream side of the afocal system.

The first retardation film 28a transmits the first light beams BL1 and converts it into second light beams (second light) BL2 containing the first polarized light component and the second polarized light component. The polarization direction of the second polarized light, component is perpendicular to the polarization direction of the first polarized light component.

In the present embodiment, the first retardation film 28a is a quarter wave plate. The first retardation film 28a, which is a quarter wave plate, converts the linearly polarized first light beams BL1 into the circularly polarized second light beams BL2. In the present specification, the "circularly polarized light" is a concept including not only perfectly circular polarized light, the two polarized light components of which have the same intensity, but elliptically polarized light, the two polarized light components of which have different intensities.

Figure 3:
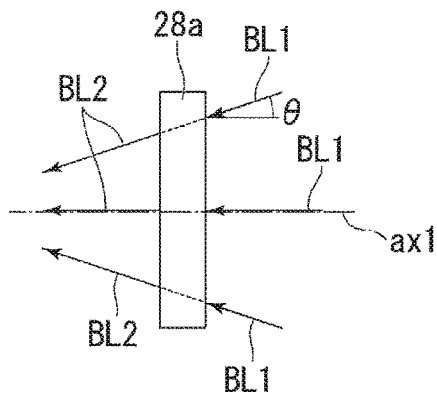
FIG. 3 diagrammatically shows the optical paths of light beams incident on a first retardation film in the illuminator according to the first embodiment.

FIG. 3 diagrammatically shows the optical paths of light beams incident on the first retardation film 28a.

The angle of incidence θ of the first light beam BL1 incident on the first retardation film 28a is 0° at the point where the optical axis ax1, which is the center axis of the first light beam BL1, intersects the first retardation film 28a and increases as the distance from the optical axis ax1 to the intersection increases, as shown in FIG. 3. The distance over which the light travels through the first retardation film 28a increases as the angle of incidence θ of the first light beam BL1 increases, and the polarization state of the second light beam BL2 having exited out of the first retardation film 28a changes accordingly.

Figure 4:
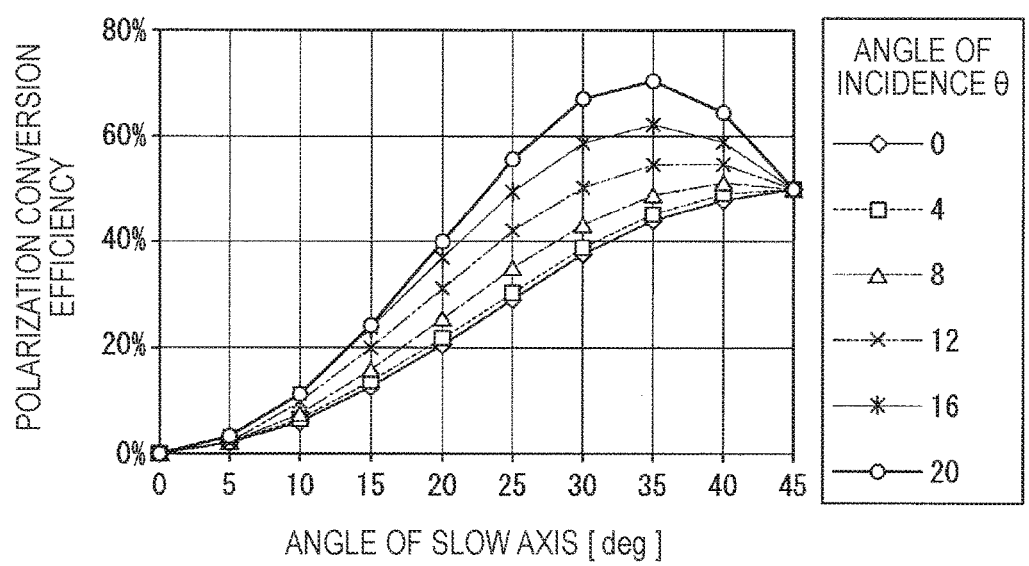
FIG. 4 shows graphs illustrating polarization conversion efficiency of a quarter wave plate according to the angle of incidence of light incident thereon.

FIG. 4 shows graphs illustrating polarization conversion efficiency in a case where linearly polarized light is incident on a quarter wave plate corresponding to the first retardation film 28a in the present embodiment at an angle of incidence θ ranging from 0° to 20°. In FIG. 4, the horizontal axis represents the angle of the slow axis of the quarter wave plate with respect to the polarization direction of the linearly polarized light incident on the quarter wave plate. The polarization conversion efficiency increases as the angle of incidence θ of the linearly polarized light increases irrespective of the angle of the slow axis, as shown in FIG. 4.

In the present embodiment, when the angle of incidence θ of a first light beam BL1 increases, the proportion of the second polarized light component in the second light beam BL2 increases. Since the angle of incidence θ increases with the distance from the optical axis ax1, the proportion of the second polarized light component in the second light beam BL2 gradually increases with the distance from the optical axis ax1 toward the outer side of the first retardation film 28a.

The polarization adjusting mechanism 28c is connected to the first retardation film 28a, as shown in FIG. 2. The polarization adjusting mechanism 28c rotates the first-retardation film 28a in a plane that intersects the center axis of one of the first light beams BL1 (optical axis ax1 in the present embodiment). That is, the polarization adjusting mechanism 28c changes the angle of the slow axis of the first retardation film 28a. The polarization adjusting mechanism 28c thus adjusts the proportions of the first and second polarized light components in each of the second light beams BL2 that exit out of the first retardation film 28a.

The second light beams BL2 having exited out of the afocal system 23 enter the homogenizer system 24. The homogenizer system 24 converts the optical intensity distribution of each of the second light beams BL2 into a uniform distribution (what is called top-hat distribution). The homogenizer system 24 includes a first multi-lens array 24a and a second multi-lens array 24b arranged along the optical axis.

The array light source 21, the collimator system 22, the afocal system 23, the first retardation film 28a, the polarization adjusting mechanism 28c, and the homogenizer system 24 form a light source unit 25. The light source unit 25 in the present, embodiment outputs the second light beams BL2, which are each circularly polarized light containing the first and second polarized light components. The second light beams BL2 radiated from the light source unit 25 are incident on the polarization separation element 50.

In the present embodiment, the first polarized light, component in the appended claims is the S-polarized light component with respect to the polarization separation element 50, and the second polarized light component in the appended claims is the P-polarized light component, with respect to the polarization separation element 50. In the following description, the first polarized light component is referred to as the S-polarized light component, and the second polarized light component is referred to as the P-polarized light component. In Variation 1, which will be described later, in an illuminator 2 having the same structure as that in the present embodiment, the first polarized light component in the appended claims is the P-polarized light component with respect to the polarization separation element 50, and the second polarized light component in the appended claims is the S-polarized light component with respect to the polarization separation element 50.

The optical element 25A is formed, for example, of a wavelength selective dichroic prism. The dichroic prism has an inclining surface K, which inclines by 45° with respect to the optical axis ax1. The inclining surface K also inclines by 45° with respect to the optical axis ax2. The optical element 25A is so disposed that the intersection of the optical axes ax1 and ax2 perpendicular to each other coincides with the optical center of the inclining surface K. The optical element 25A does not necessarily have a prism-like shape, such as a dichroic prism, and may instead be a flat-plate-shaped dichroic mirror having surfaces parallel to each other.

The polarization separation element 50, which is a wavelength selective element, is provided along the inclining surface K. The polarization separation element 50 has a polarization separation function of separating each of the second light beams BL2 into the S-polarized light component (first, polarized light component) and the P-polarized light-component (second polarized light component). Specifically, the polarization separation element 50 reflects the S-polarized light component in each of the second light, beams BL2 and transmits the P-polarized light component in the second light beam BL2. The polarization separation element 50 further has a color separation function of transmitting fluorescence YL, which belongs to a wavelength band different from the wavelength band to which the second light beams BL2, which is blue light, belong, irrespective of the polarization state of the fluorescence YL.

The polarization separation element 50 separates the circularly polarized second light beams BL2 into third light beams $BM_{Se}3$, which are each formed of the S-polarized light component (first polarized light component) with respect to the polarization separation element 50, and fourth light beams $BM_p4$, which are each formed of the P-polarized light component (second polarized light component) with respect to the polarization separation element 50. The third light beams $BM_{Se}3$, which are each formed of the S-polarized light component, are reflected off the polarization separation element 50, travel toward the fluorescence emitting element 27, and are used as the excitation light. The fourth light beams $BM_p4$, which are each formed of the P-polarized light component, pass through the polarization separation element 50 and travel toward the diffusive reflection element 30. That is, one of the third and fourth light beams separated by the polarization separation element 50 is incident on the diffusive reflection element 30, and the other one of the third and fourth light beams separated by the polarization separation element 50 is incident on the fluorescence emitting element 27.

The third light beams $BM_{Se}3$ reflected off the polarization separation element 50 are incident on the phosphor layer 34 of the fluorescence emitting element 27 via the first pickup system 26. The phosphor layer 34 contains a phosphor excited with the excitation light having, for example, a wavelength of 460 nm (third light beams $BM_{Se}3$). The phosphor produces the fluorescence (yellow light) YL, the intensity of which peaks at a wavelength within a wavelength region ranging, for example, from 500 to 700 nm.

The fluorescence YL emitted from the phosphor layer 34 is non-polarized light formed of light components the polarization directions of which are not aligned with one another. The fluorescence YL passes through the first pickup system 26 and is then incident on the polarization separation element 50. Since the polarization separation element 50 has a characteristic that transmits the fluorescence YL irrespective of the polarization state thereof, the fluorescence YL passes through the polarization separation element 50 and travels toward the uniform illumination system 40.

On the other hand, the P-polarized fourth light beams $BM_p4$ having passed through the polarization separation element 50 are incident on the second retardation film 28b. The second retardation film 28b is disposed in the optical path between the polarization separation element 50 and the diffusive reflection element 30. The second retardation film 28b in the present embodiment is a quarter wave plate. The P-polarized fourth light beams $BM_p4$ having exited out of the polarization separation element 50 are converted by the second retardation film 28b into circularly polarized fifth light beams $BM_C5$. In the present embodiment, the fifth light beams $BM_C5$ are each right-handed circularly polarized light. The fifth light beams $BM_C5$ then enter the second pickup system 29.

The second pickup system 29 is disposed along with the second retardation film 28b in the optical path between the polarization separation element 50 and the diffusive reflection element 30. The second, pickup system, (light collection system) 29 collects the fifth light beams $BM_C5$ and directs the collected light beams toward the diffusive reflection element 30.

The diffusive reflection element (diffuser element) 30 diffusively reflects the fifth light beams $BM_C5$ having exited out of the second pickup system 29 toward the polarization separation element 50. The diffusive reflection element 30 converts the right-handed circularly polarized fifth light-beams $BM_C5$ into left-handed circularly polarized sixth light beams $BM_C6$ and reflects the sixth light beams $BM_C6$.

Figure 5:
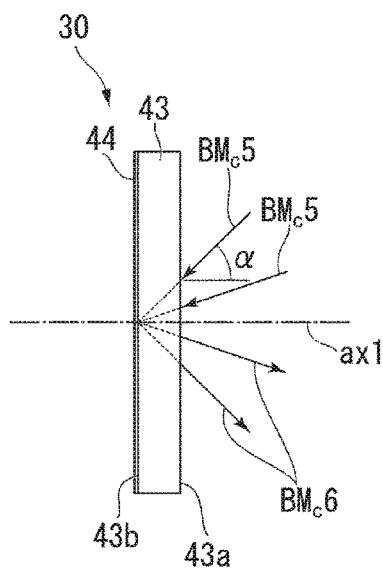
FIG. 5 diagrammatically shows a diffusive reflection element and the optical paths of light beams incident on the diffusive reflection element in the illuminator according to the first embodiment.

FIG. 5 is a diagrammatic view showing the diffusive reflection element 30 and the fifth light, beams $BM_C5$ incident on the diffusive reflection element 30.

The diffusive reflection element 30 in the present embodiment includes a base 43 and a reflection film 44. The base 43 is made of a light transmissive material, for example, glass. The base 43 is a plate having a first surface 43a, on which light is incident and through which light exits, and a second surface 43b, which is located on the side opposite the first, surface 43a. The reflection film 44 is formed on the second surface 43b of the base 43. The reflection film 44 is a metal reflection film made of a metal having high light reflectance, for example, silver and aluminum.

The diffusive reflection element 30 may be a diffuser element so configured, that minute irregularities are formed on one of or both the first surface 43a and the second surface 43b of the base 43 or a diffuser element so configured that fine particles having a refractive index different from, the refractive index of the base 43 are dispersed in the base 43.

The light to be incident on the diffusive reflection element 30 has been collected by the second pickup system 29, as shown, in FIG. 5. Therefore, the angle of incidence α of the fifth light beam. $BM_C5$ incident on the diffusive reflection element 30 is 0° at the point where the optical axis ax1, which is the center axis of the fifth light beam $BM_C5$, intersects with the diffusive reflection element 30 and gradually increases as the distance from the optical axis ax1 to the intersection increases.

The fifth light beams $BM_C5$ are each derived from the second polarized light component (P-polarized light component) in the second light beam BL2 converted by the first retardation film 28a. The proportion of the second, polarized light component in the second light beam BL2 gradually increases with distance from the optical axis ax1 toward the outer side of the diffusive reflection element 30. The intensity of each of the fifth light beams $BM_C5$ therefore increases with distance from the optical axis ax1 toward the outer side of the diffusive reflection element 30. The fifth light beams $BM_C5$ are therefore incident on the diffusive reflection element 30 with the intensity of a fifth light beam $BM_C5$ having a large angle of incidence α being greater than the intensity of a fifth light beam $BM_C5$ having a small angle of incidence α.

In a case where light is incident on a diffuser element (diffusive reflection element 30 in the present embodiment), diffusion close to ideal Lambertian diffusion can be achieved by increasing the angle of incidence α even in a case where the diffuser element has a weak diffusion characteristic. This will be described with reference to FIGS. 6 and 7.

Figure 6:
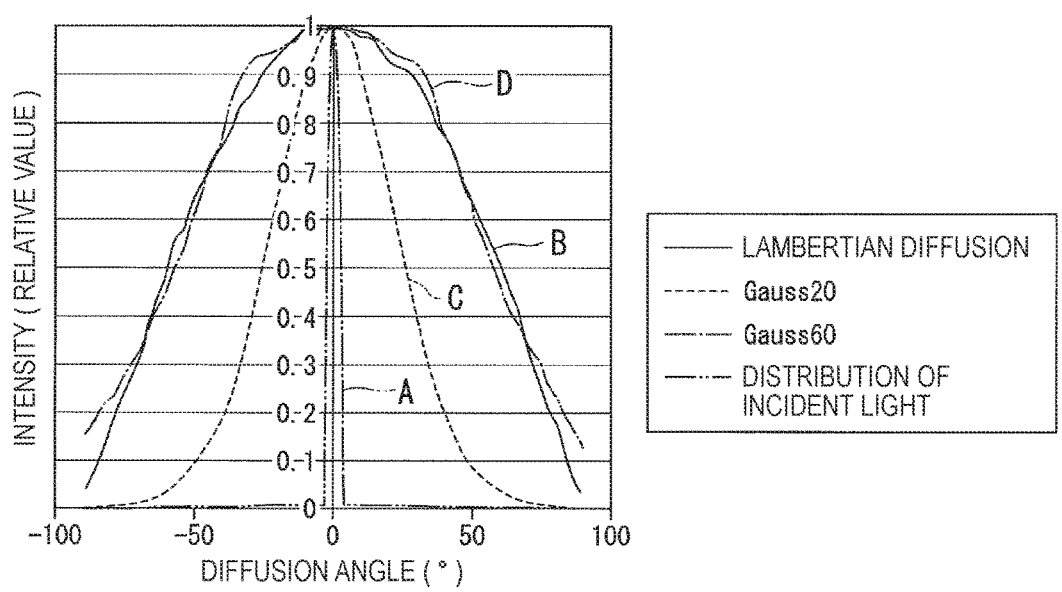
FIG. 6 shows graphs illustrating the diffusion angle distribution in a case where a light ray flux is incident on a diffuser element at an angle of incidence of 0°.

FIG. 6 shows graphs illustrating the diffusion angle distribution in a case where a light ray flux is incident on the diffuser element at the angle of incidence α of 0°. The horizontal axis of FIG. 6 represents the diffusion angle (°) over which the incident light is diffused, and the vertical axis of FIG. 6 represents the intensity (relative value) of the diffused light. It is assumed that the angular width of the incident light ray flux has a narrow angle distribution of smaller than or equal to ±5° (graph A drawn in the form of two-dot chain line in FIG. 6).

In FIG. 6, assuming that the diffusion element produces ideal Lambertian diffusion, the light that exits out of the diffuser element has g a wide angle distribution, as indicated by the graph B drawn in the form of the solid line.

The actual diffuser element, however, does not produce ideal Lambertian diffusion but produces diffusion according to a predetermined Gaussian distribution. In a case where the diffuser element has a weak diffusion characteristic, an angle distribution far different from the angle distribution of the Lambertian diffusion is produced, as indicated by the graph C drawn in the form of the broken line. To achieve an angle distribution that roughly coincides with the angle distribution of the Lambertian diffusion, as indicated by the graph D drawn in the form of the chain line, the diffuser element needs to have a sufficiently strong diffusion characteristic. A diffuser element having a strong diffusion characteristic, however, has a large amount, of backscatter and other disadvantages, and it is therefore difficult to produce diffused light having a wide angle distribution.

The numeral X in "GaussX," such as "Gauss20" and "Gauss60," in FIG. 6 is a parameter in an angle distribution simulation conducted by the present inventor. The greater the numeral, the stronger the diffusion characteristic of the diffuser element.

Figure 7:
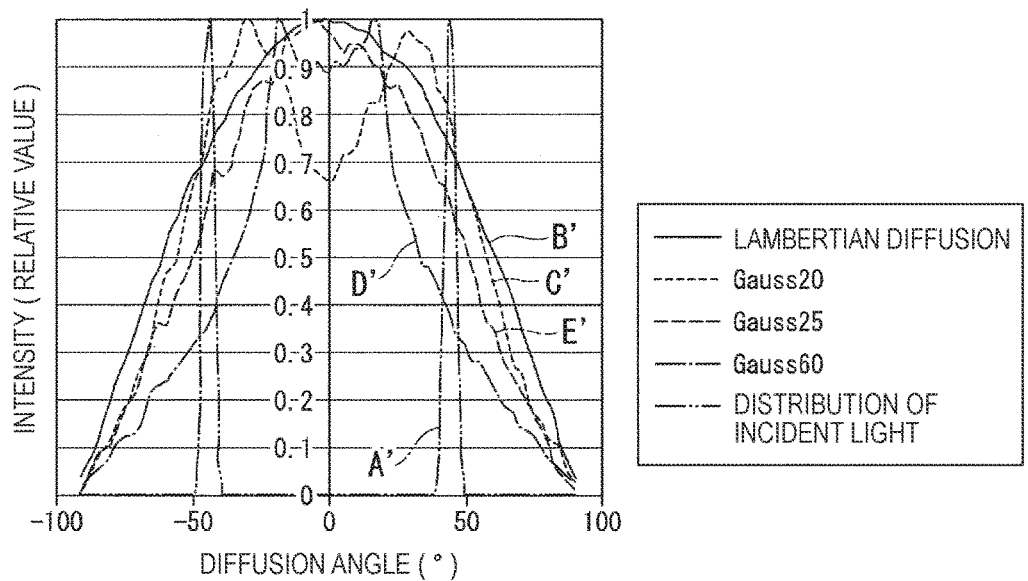
FIG. 7 shows graphs illustrating the diffusion angle distribution in a case where two light ray fluxes are incident on the diffuser element at angles of incidence of +50° and −50°.

FIG. 7 shows graphs illustrating the diffusion angle distribution in a case where two light ray fluxes are incident on the diffuser element at angles of incidence α of +50° and −50°. The horizontal axis of FIG. 7 represents the diffusion angle (°), and the vertical axis of FIG. 7 represents the intensity (relative value). It is assumed that the angular width of the incident light ray flux has a narrow angle distribution of smaller than or equal to ±5° (graph A' drawn in the form of two-dot chain line in FIG. 7).

In the simulation shown in FIG. 6, an angle distribution that roughly coincides with the angle distribution of the Lambertian diffusion is achieved in the case where the diffusion element has a diffusion characteristic as strong as the "Gauss60" diffusion characteristic. In contrast, the simulation shown in FIG. 7 demonstrated that a diffusion element having a diffusion characteristic as weak as the "Gauss20" or "Gauss25" diffusion characteristic can be used to achieve an angle distribution close to the angle distribution of the Lambertian diffusion indicated by the graph B' drawn in the form of the solid line, as indicated by the graphs C' and E' each drawn in the form of the broken lines. A diffusion element having a weak diffusion characteristic produces a small amount of backscatter and can therefore use light at high efficiency. The simulation in FIG. 7 also demonstrates that increasing the degree of the diffusion characteristic to about "Gauss60" results, contrary to expectations, in separation from the Lambertian diffusion, as indicated by the graph D' drawn in the form of the chain line. The simulation demonstrates that a strong diffusion characteristic should not be used also from this point of view.

According to the present embodiment, the light distribution in the first retardation film 28a is so achieved that the proportion of the second polarized light component increases with distance from the optical axis ax1 toward the outer side of the first retardation film 28a. Further, the light separated by the polarization separation element 50 and containing the second polarized light component (P-polarized light component) is collected by the second pickup system 29 and incident on the diffusive reflection element. The proportion of the light having a large angle of incidence a can therefore be increased in the light incident on the diffusive reflection element 30 (fifth light beams $BM_C5$). As a result, the diffusion produced by the diffusive reflection element 30 is allowed to approach the Lambertian diffusion with no enhancement of diffusion characteristic of the diffusive reflection element 30.

The sixth light beams $BM_C6$ having exited out of the diffusive reflection element 30 are incident again on the second retardation film 28b, which converts the sixth light beams $BM_C6$ into S-polarized seventh light beams $BM_{Sd}7$, as shown in FIG. 2. The seventh light beams $BM_{Sd}7$ are then incident on the polarization separation element 50.

The S-polarized seventh light beams $BM_{Sd}7$ are reflected off the polarization separation element 50 and travel toward the uniform illumination system 40. The seventh light beams $BM_{Sd}7$ are each blue light. The fluorescence YL is yellow light. That is, the blue light (seventh light beams $BM_{Sd}7$) and the yellow light (fluorescence YL) exit out of the polarization separation element 50 in the same direction and are combined with each other to form the illumination light (white light) WL.

The uniform illumination system 40 includes an optical integration system 31, a polarization conversion element 32, and a superimposing system 33. The uniform illumination system 40 makes the intensity distribution of the illumination light WL having exited out of the polarization separation element 50 uniform in an illuminated area. The illumination light WL having exited out of the uniform illumination system 40 enters the color separation system 3 (see FIG. 1).

According to the present embodiment, since the first retardation film 28a is disposed between the first lens 23a and the second lens 23b of the afocal system 23, the size of the illuminator can be reduced. Further, according to the present embodiment, the size of the projector 1 can be reduced as a result of the reduction in the size of the illuminator.

Figure 8:
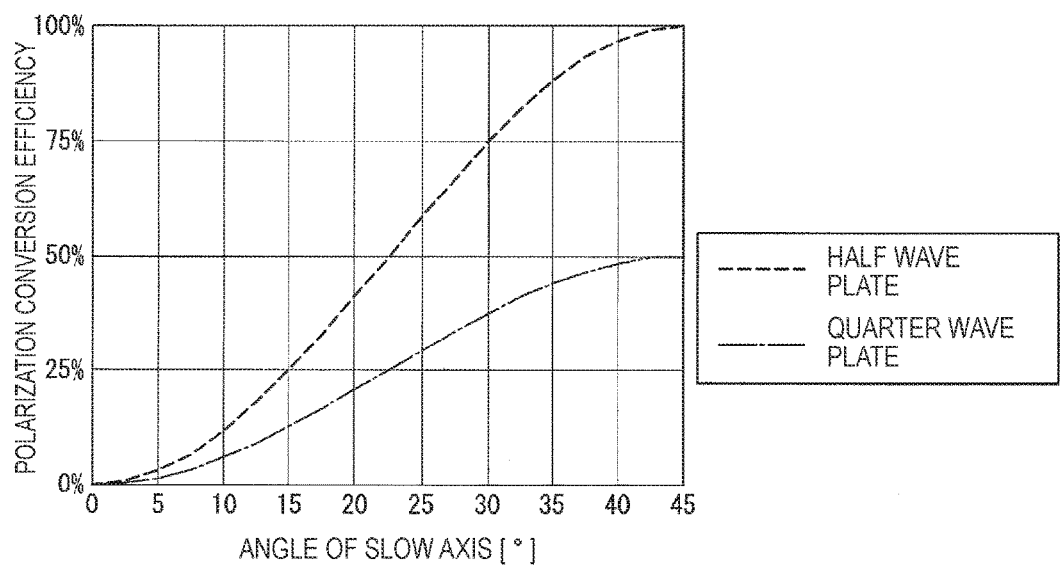
FIG. 8 shows graphs illustrating the polarization conversion efficiency versus the angle of the slow axes of a half wave plate and a quarter wave plate usable as a first retardation film in the first embodiment.

FIG. 8 shows graphs illustrating the polarization conversion efficiency versus the angle of the slow axes of a half wave plate and a quarter wave plate usable as the first retardation film 28a in the present embodiment. The vertical axis of FIG. 8 represents the proportion of the second polarized light component in any of the second light beams BL2, which are converted light beams from the first retardation film 28a. The term "angle of the slow axis" means the inclination angle of the slow axis (optic axis) of the first retardation film 28a with respect to the polarization direction of linearly polarized light incident on the first retardation film 28a.

In the present embodiment, a quarter wave plate is used as the first retardation film 28a to adjust the proportion of the second polarized light component of the first light to a value ranging from 0% to 50%. In the case where the polarization adjusting mechanism 28c is used to cause the first retardation film (quarter wave plate) 28a to make a full turn in a plane that intersects the optical axis ax1, the proportion of the second polarized light component changes only over the range from 0% to 50%. A quarter wave plate therefore has, as compared with a half wave plate, low sensitivity of the change in the proportion of a polarized light component in response to the angle of rotation. According to the present embodiment, using a quarter wave plate as the first retardation film 28a allows fine adjustment of the proportion of the second polarized light component.

In FIG. 8, using a quarter wave plate and setting the angle of the slow axis thereof at γ1 allows the proportion of the first polarized light component (S-polarized light component) to be 80% and the proportion of the second polarized light component (P-polarized light component) to be 20%.

In the present embodiment, as the first retardation film 28a, the quarter wave plate may be replaced with a half wave plate. The first retardation film 28a formed of a half wave plate can adjust the proportion of each of the first and second polarized light components of each of the second light beams BL2 to a value ranging from 0% to 100%. In general, white combined light is produced by causing 10% to 30% of the light to be separated by the polarization separation element 50 to be incident on the diffuser element and causing 70% to 90% of the light to be separated by the polarization separation element 50 to be incident on the fluorescence emitting element 27. The polarization separation element 50 in the present embodiment reflects the S-polarized light component (first polarized light component) and transmits the P-polarized light component (second polarized light component) to separate each of the second light beams BL2 into the P-polarized light component and the S-polarized light component. Since using a half wave plate as the first retardation film 28a allows the proportion of the first polarized light component to be adjusted to any value, the proportion of the light reflected off the polarization separation element 50 and the proportion of the light passing through the polarization separation element 50 can be freely set. The diffusive reflection element 30 and the fluorescence emitting element 27 can therefore be freely arranged relative to the polarization separation element 50.

In FIG. 8, using a half wave plate and setting the angle of the slow axis thereof at γ2 allows the proportion of the first polarized light component (S-polarized light component) to be 80% and the proportion of the second polarized light component (P-polarized light component) to be 20%.

In FIG. 8, using a half wave plate and setting the angle of the slow axis thereof at γ3 allows the proportion of the first polarized light component (S-polarized light component) to be 20% and the proportion of the second, polarized light component (P-polarized light component) to be 80%. In this case, a half wave plate is further provided as a third retardation film 28d (see FIG. 2) between the afocal system 23 and the homogenizer system 24. As a result, the proportions of the S-polarized light component and the P-polarized light component, to be incident on the polarization separation element 50 are reversed, so that 80% of the light may be incident as the S-polarized light component on the fluorescence emitting element 27. The configuration described above may instead be employed.

Still instead, a one-eighth wave plate may be used as the first retardation film 28a. A one-eighth wave plate has, as compared with a quarter wave plate, low sensitivity of the change in the proportion of a polarized light component in response to the angle of rotation. Using a one-eighth wave plate as the first retardation film 28a therefore allows finer adjustment of the proportion of the second polarized light component.

The polarization separation element 50 in the present embodiment transmits one (P-polarized light component) of the first polarized light component (S-polarized light component) and the second polarized light component (P-polarized light component) and reflects the other polarized light component (S-polarized light component). The light having passed through the polarization separation element 50 (fifth light beams $BM_C5$ separated by polarization separation element 50 and derived from P-polarized light, component) is incident on the diffusive reflection element 30. On the other hand, the light reflected off the polarization separation element 50 (third light, beams $BM_{Se}3$ separated by polarization separation element 50 and derived from S-polarized light-component) is incident on the fluorescence emitting element 27.

According to the present embodiment, the illuminator 2 having the following structure can be achieved: The light reflected off the polarization separation element 50 excites the fluorescence emitting element 27; and the light having passed through the polarization separation element 50 is incident on the diffusive reflection element 30.

Variation 1 of First Embodiment

As Variation 1 of the first embodiment, a description will be made of a case where the first polarized light component contained in each of the first light beams BL1 is the P-polarized light component with respect to the polarization separation element 50. That is, in the present variation, the first polarized light component in the appended claims is the P-polarized light component with respect to the polarization separation element 50, and the second polarized light component in the appended claims is the S-polarized light component with respect to the polarization separation element 50. The structure of the illuminator 2 according to the present variation is roughly the same as the structure in the embodiment described above except that the polarized light component (first polarized light component) of each of the first light beams BL1 emitted from the array light source 21 is the P-polarized light component.

In the present variation, the first light beams BL1 radiated from the array light source 21 and containing the P-polarized light component (first polarized light component) are converted into the second light beams BL2 by the first retardation film 28a. The second light beams BL2 each contain the P-polarized light component and the S-polarized light-component (second polarized light component).

According to the present variation, the first retardation film 28a, when it transmits the first light beams BL1, converts part of the P-polarized light, component into the S-polarized light component to form the second light beams BL2. The first retardation film 28a therefore causes the proportion of the S-polarized light component to increase with distance from the optical axis ax1. The S-polarized light component, is separated from the P-polarized light component when it is reflected off the polarization separation element 50, further collected by the first pickup system 26, and then incident on the fluorescence emitting element 27.

According to the present variation, since the illuminator having the same component arrangement as that in the first embodiment described above, the size of the illuminator can be reduced by the space required to dispose the first retardation film 28a, as in the first embodiment.

In the present variation, the polarization separation element 50 transmits one (P-polarized light component) of the first polarized light component (P-polarized light component) and the second polarized light component (S-polarized light component) and reflects the other polarized light component (S-polarized light component). Further, in the present variation, the light having passed through the polarization separation element 50 (fifth light beams $BM_C 5$ separated by the polarization separation element 50 and derived from P-polarized light component) is incident on the diffusive reflection element 30, as in the embodiment described above. On the other hand, the light reflected off the polarization separation element 50 (third light beams $BM_{Se} 3$ separated by polarization separation element 50 and derived from S-polarized light component) is incident on the fluorescence emitting element 27.

According to the present variation, the illuminator 2 having the following structure can be achieved: The light reflected off the polarization separation element 50 excites the fluorescence emitting element 27; and the light having passed through the polarization separation element 50 is incident on the diffusive reflection element 30, as in the first embodiment described above.

Second Embodiment

A second embodiment of the invention will be described below with reference to FIG. 9.

The basic configuration of an illuminator according to the present embodiment is the same as that of the illuminator according to the first embodiment, but the second embodiment differs from the first embodiment in terms of the positional relationship between the diffusive reflection element and the fluorescence emitting element.

Figure 9:
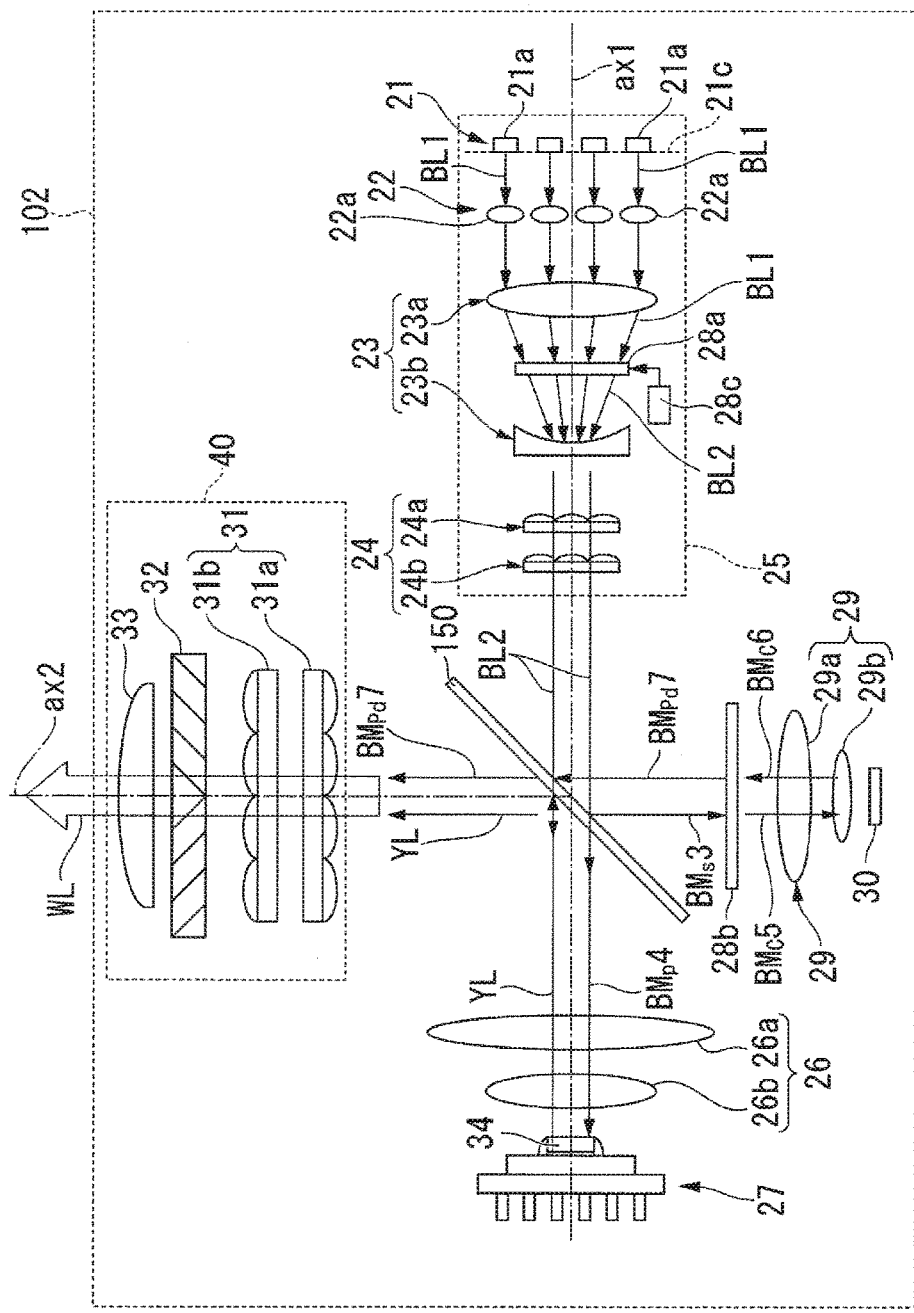
FIG. 9 is a schematic configuration diagram of an illuminator according to a second embodiment.

FIG. 9 is a schematic configuration diagram of an illuminator 102 according to the second embodiment. In FIG. 9, components common to those of the illuminator 2 according to the first embodiment have the same reference characters and will not be described.

A polarization separation element 150 in the present embodiment has a characteristic, unlike the polarization separation element 50 in the first embodiment, that the polarization separation element 150 reflects fluorescence that belongs to a wavelength band different from the wavelength band to which blue light belongs irrespective of the polarization state of the fluorescence. In accordance with the difference in the characteristic of the polarization separation element, the positional relationship between the diffusive reflection element 30 and the fluorescence emitting element 27 in the illuminator 102 according to the present embodiment is reversed from the positional relationship in the first embodiment.

In the illuminator 102 according to the present embodiment, the light source unit 25, the polarization separation element 150, the first pickup system 26, and the fluorescence emitting element 27 are arranged along the optical axis ax1, as shown in FIG. 9.

The light source unit 25 includes the array light source 21, the collimator system 22, the afocal system 23, the first retardation film 28a, the polarization adjusting mechanism 28c, and the homogenizer system 24. The first retardation film 28a is located between the first lens 23a and the second lens 23b of the afocal system 23 also in the present embodiment.

The diffusive reflection element 30, the second pickup system 29, the second retardation film 28b, the polarization separation element 150, and the uniform illumination system 40 are arranged along the optical axis ax2.

The array light source (light source apparatus) 21 in the present embodiment outputs, as the first polarized light component, first light beams BL1, which are each linearly polarized light formed of the P-polarized light component with respect to the polarization separation element 150. The first light beams BL1 radiated from the array light source 21 and containing the P-polarized light component (first polarized light component) are converted by the first retardation film 28a into second light, beams BL2. The second light beams BL2 each contain the P-polarized light component and the S-polarized light component (second polarized light component).

In the present embodiment, the first polarized light component in the appended claims is the P-polarized light component with respect to the polarization separation element 150, and the second polarized light component in the appended claims is the S-polarized light component with respect to the polarization separation element 150.

The first retardation film 28a in the present embodiment, when it transmits the first light beams BL1, converts part of the P-polarized light component into the S-polarized light component to form the second light beams BL2. The first retardation film 28a therefore causes the proportion of the S-polarized light component to increase with distance from the optical axis ax1.

The S-polarized light component contained in the second light beams BL2 is reflected off the polarization separation element 150 and travels as third light beams $BM_S3$ toward the second retardation film 28b. The P-polarized light component contained, in the second light beams BL2 passes through the polarization separation element 150 and travels as fourth light beams $BM_p4$ toward the fluorescence emitting element 27.

The third light beams $BM_S3$ having exited out of the polarization separation element 150 are converted by the second retardation film 28b into right-handed circularly polarized fifth light beams $BM_C5$. The fifth light beams $BM_C5$ are then incident on the diffusive reflection element 30 via the second pickup system 29. The diffusive reflection element 30 converts the fifth light beams $BM_C5$ incident thereon into left-handed circularly polarized sixth light beams $BM_C6$ and diffusively reflects the sixth light beams $BM_C6$ toward the polarization separation element 150.

The sixth light beams $BM_C6$ diffusively reflected off the diffusive reflection element 30 are incident again, on the second retardation film 28b, which converts the sixth light beams $BM_C6$ into P-polarized seventh light beams $BM_{Pd}7$. The P-polarized seventh light beams $BM_{Pd}7$ then pass through the polarization separation element 150 and travel toward the uniform illumination system 40.

The fourth light beams $BM_p4$, which are each formed of the P-polarized light component and have exited out of the polarization separation element 150, are incident as the excitation light on the fluorescence emitting element 27 via the first pickup system 26. As a result, the fluorescence emitting element 27 emits the fluorescence (yellow light) YL. The fluorescence YL passes through the first pickup system 26 and is then incident on the polarization separation element 150. Since the polarization separation element 150 has a characteristic that reflects the fluorescence YL irrespective of the polarization state thereof, the fluorescence YL is reflected off the polarization separation element 150 and travels toward the uniform illumination system 40.

According to the present embodiment, the S-polarized light component converted by the first retardation film 28a is separated, when reflected off the polarization separation element 150, from the P-polarized light component, further collected by the second pickup system 29, and incident on the diffusive reflection element 30. Therefore, in the present embodiment, the proportion of light having a large angle of incidence α increases in the light incident on the diffusive reflection element 30 (fifth light beams $BM_C5$). The diffusion produced by the diffusive reflection element 30 is therefore allowed to approach the Lambertian diffusion.

According to the present embodiment, the first retardation film 28a is disposed between the first lens 23a and the second lens 23b of the afocal system 23, whereby the size of the illuminator can be reduced, as in the first embodiment.

The polarization separation element 150 in the present embodiment transmits one (P-polarized light component) of the first polarized light component (P-polarized light component) and the second polarized light component (S-polarized light component) and reflects the other polarized light component (S-polarized light component). The light reflected off the polarization separation element 150 (fifth light beams $BM_C5$ separated by the polarization separation element 150 and derived from S-polarized light component) is incident on the diffusive reflection element 30. On the other hand, the light having passed through the polarization separation element 150 (fourth light beams $BM_p4$ separated by polarization separation element 150 and derived from P-polarized light component) is incident on the fluorescence emitting element 27.

According to the present embodiment, the illuminator 102 having the following structure can be achieved: The light having passed through the polarization separation element 150 excites the fluorescence emitting element 27; and the light reflected off the polarization separation element 150 is incident on the diffusive reflection element 30.

Variation 2 of Second Embodiment

As Variation 2 of the second embodiment, a description will be made of a case where the first polarized light component contained in the first light beams BL1 is the S-polarized light component with respect to the polarization separation element 150. That is, in the present variation, the first polarized light component in the appended claims is the S-polarized light component with respect to the polarization separation element 150, and the second polarized light component in the appended claims is the P-polarized light component with respect to the polarization separation element 150. The structure of the illuminator 102 according to the present variation is roughly the same as the structure in the embodiment described above except that the polarized light component (first, polarized light component) in the first, light-beams BL1 emitted from the array light source 21 is the S-polarized light component.

In the present variation, the first light beams BL1 radiated from the array light source 21 and containing the S-polarized light component (first polarized light component) are converted into the second light beams BL2 by the first retardation film 28a. The second light beams BL2 each contain the S-polarized light component and the P-polarized light component (second polarized light component).

According to the present variation, the first retardation film 28a, when it transmits the first light beams BL1, converts part of the S-polarized light component into the P-polarized light component to form the second light beams BL2. The first retardation film 28a therefore causes the proportion of the P-polarized light component to increases with distance from the optical axis ax1. The P-polarized light component is separated from the S-polarized light, component when it passes through the polarization separation element 150, further collected by the first pickup system 26, and then incident on the fluorescence emitting element 27.

In the present variation, the polarization separation element 150 transmits one (P-polarized light component) of the first polarized light component (S-polarized light component) and the second polarized light component (P-polarized light component) and reflects the other polarized light component (P-polarized light component). Further, in the present variation, the light reflected off the polarization separation element 150 (fifth light beams $BM_C5$ separated by the polarization separation element 150 and derived from S-polarized light component) is incident on the diffusive reflection element 30, as in the embodiment described above. On the other hand, the light having passed through the polarization separation element 150 (fourth light beams $BM_p4$ separated by the polarization separation element 150 and derived from P-polarized light component) is incident on the fluorescence emitting element 27.

According to the present variation, the illuminator 102 having the following structure can be achieved: The light having passed through the polarization separation element 150 excites the fluorescence emitting element 27; and the light reflected off the polarization separation element 150 is incident on the diffusive reflection element 30, as in the second embodiment described above.

According to the present variation, since the illuminator having the same component arrangement as that in the second embodiment described above is used, the size of the illuminator can be reduced by the space required to dispose the first retardation film 28a, as in the second embodiment.

A variety of embodiments of the invention and variations thereof have been described, but the configurations, the combination thereof, and other factors in the embodiments and the variations thereof are presented by way of example, and addition, omission, replacement, and other changes of the configurations can be made to the extent that they do not depart from the substance of the invention.

For example, the shape, the number, the arrangement, the material, and other factors of the variety of components of the illuminator and the projector are not limited to those in the embodiments described above and can be changed as appropriate.

In each of the embodiments, the diffusive reflection element 30 and the fluorescence emitting element 27 may be stationary, as shown in the embodiments described above, or may be rotatable.

In each of the embodiments of the invention, the illuminator according to the embodiment is incorporated in a projector using liquid crystal valves by way of example, but not necessarily. The illuminator may be incorporated in a projector using digital micro mirror devices as the light modulators.

In each of the embodiments of the invention, the illuminator according to the embodiment is incorporated in a projector by way of example, but not necessarily. The illuminator according to each of the embodiments of the invention may be used as a lighting apparatus, a headlight of an automobile, and other components.

The entire disclosure of Japanese Patent Application No. 2017-149708, filed on Aug. 2, 2017 is expressly incorporated by reference herein.

What is claimed is:

1. An illuminator comprising:
a light source apparatus that outputs first light containing a first polarized light component;
an afocal system that includes a first lens and a second lens so arranged that optical axis directions thereof coincide with each other and reduces a light flux diameter of the first light;
a polarization adjusting element that converts the first light, while transmitting the first light, into second light containing the first polarized light component and a second polarized light component a polarization direction of which is perpendicular to a polarization direction of the first polarized light component;
a polarization separation element that separates the second light into light formed of the first polarized light component and light formed of the second polarized light component;
a diffuser element on which one of the light beams separated by the polarization separation element is incident;
a fluorescence emitting element on which the other one of the light beams separated by the polarization separation element is incident,
wherein the polarization adjusting element is located between the first lens and the second lens; and
a polarization adjusting mechanism that adjusts proportions of the first and second polarized light components in the second light by rotating the polarization adjusting element in a plane that intersects a center axis of the first light.

2. The illuminator according to claim 1,
wherein the light outputted by the light source apparatus is blue light, and
light converted by the fluorescence emitting element in terms of wavelength and emitted by the fluorescence emitting element is yellow light.

3. A projector comprising:
the illuminator according to claim 2;
a light modulator that modulates light outputted from the illuminator in accordance with image information to form image light; and
a projection system that projects the image light.

4. The illuminator according to claim 1,
further comprising a light collection system disposed in an optical path between the polarization separation element and the diffuser element,
wherein the light separated by the polarization separation element and formed of the second polarized light component is collected by the light collection system and incident on the diffuser element.

5. The illuminator according to claim 4,
wherein the polarization separation element reflects the light formed of the first polarized light component and transmits the light formed of the second polarized light component,
the light formed of the second polarized light component and having passed through the polarization separation element is incident on the diffuser element, and
the light formed of the first polarized light component and reflected off the polarization separation element is incident on the fluorescence emitting element.

6. A projector comprising:
the illuminator according to claim 5;
a light modulator that modulates light outputted from the illuminator in accordance with image information to form image light; and
a projection system that projects the image light.

7. The illuminator according to claim 4,
wherein the polarization separation element transmits the light formed of the first polarized light component and reflects the light formed of the second polarized light component,
the light formed of the second polarized light component and reflected off the polarization separation element is incident on the diffuser element, and
the light formed of the first polarized light component and having passed through the polarization separation element is incident on the fluorescence emitting element.

8. A projector comprising:
the illuminator according to claim 7;
a light modulator that modulates light outputted from the illuminator in accordance with image information to form image light; and
a projection system that projects the image light.

9. A projector comprising:
the illuminator according to claim 4;
a light modulator that modulates light outputted from the illuminator in accordance with image information to form image light; and
a projection system that projects the image light.

10. The illuminator according to claim 1,
wherein the polarization adjusting element is a half wave plate.

11. A projector comprising:
the illuminator according to claim 10;
a light modulator that modulates light outputted from the illuminator in accordance with image information to form image light; and
a projection system that projects the image light.

12. The illuminator according to claim 1, wherein the polarization adjusting element is a quarter wave plate.

13. A projector comprising:
the illuminator according to claim 12;
a light modulator that modulates light outputted from the illuminator in accordance with image information to form image light; and
a projection system that projects the image light.

14. A projector comprising:
the illuminator according to claim 1;
a light modulator that modulates light outputted from the illuminator in accordance with image information to form image light; and
a projection system that projects the image light.

* * * * *